US011770212B2

(12) United States Patent
Wang et al.

(10) Patent No.: US 11,770,212 B2
(45) Date of Patent: Sep. 26, 2023

(54) DATA TRANSMISSION METHODS, DATA TRANSMISSION DEVICE, AND DATA TRANSMISSION APPARATUSES

(71) Applicant: BOE TECHNOLOGY GROUP CO., LTD., Beijing (CN)

(72) Inventors: Youxue Wang, Beijing (CN); Xiaohui Ma, Beijing (CN); Mengjun Hou, Beijing (CN); Kai Geng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/795,804

(22) PCT Filed: May 14, 2021

(86) PCT No.: PCT/CN2021/093859
§ 371 (c)(1),
(2) Date: Jul. 27, 2022

(87) PCT Pub. No.: WO2022/001416
PCT Pub. Date: Jan. 6, 2022

(65) Prior Publication Data
US 2023/0090831 A1 Mar. 23, 2023

(30) Foreign Application Priority Data
Jun. 30, 2020 (CN) .......................... 202010612360.2

(51) Int. Cl.
*H04L 1/00* (2006.01)
*H04W 28/04* (2009.01)
(52) U.S. Cl.
CPC .......... *H04L 1/0083* (2013.01); *H04L 1/0041* (2013.01); *H04W 28/04* (2013.01)

(58) Field of Classification Search
CPC ......... H04L 1/18; H04L 1/1809; H04L 1/816; H04L 1/819; H04L 1/1835; H04L 1/0083
See application file for complete search history.

(56) References Cited

U.S. PATENT DOCUMENTS 7,991,750 B1 8/2011 Xavier et al.
2013/0343271 A1 12/2013 El-Khamy et al.
(Continued)

FOREIGN PATENT DOCUMENTS

CN 102281121 A 12/2011
CN 102983884 A 3/2013
(Continued)

OTHER PUBLICATIONS

First Office Action for Chinese Patent Application No. 202010612360.2 issued by the Chinese Patent Office dated Jun. 6, 2022.
(Continued)

*Primary Examiner* — Shelly A Chase
(74) *Attorney, Agent, or Firm* — IP & T GROUP LLP

(57) ABSTRACT

A data transmission method, includes: receiving N data packets sent by a communication opposite-end device, wherein each data packet includes a piece of target data, and N is a positive integer greater than 1; according to a receiving sequence of the N data packets from a first data packet to an Nth data packet, sequentially determining whether a transmission error occurs in each data packet; if it is determined that a data packet is transmitted incorrectly, storing, in a first queue, a piece of first indication information which indicates the data packet is transmitted incorrectly; and after it is determined that the reception of the N data packets ends, generating a first retransmission instruction, and sending the first retransmission instruction to the
(Continued)

communication opposite-end device, wherein the first retransmission instruction includes information in the first queue.

20 Claims, 6 Drawing Sheets

(56) References Cited

U.S. PATENT DOCUMENTS

| | | | |
|---|---|---|---|
| 2018/0331791 A1 | 11/2018 | Li | |
| 2020/0092046 A1* | 3/2020 | Zhou | H04W 72/21 |
| 2020/0099478 A1* | 3/2020 | Li | H04L 1/1835 |
| 2020/0382244 A1* | 12/2020 | Xue | H04L 5/0094 |

FOREIGN PATENT DOCUMENTS

| | | |
|---|---|---|
| CN | 104113403 A | 10/2014 |
| CN | 106559186 A | 4/2017 |
| CN | 106561014 A | 4/2017 |
| CN | 108279910 A | 7/2018 |
| CN | 109120385 A | 1/2019 |
| CN | 109932966 A | 6/2019 |
| CN | 111211879 A | 5/2020 |
| WO | 2018/103637 A1 | 6/2018 |

OTHER PUBLICATIONS

Second Office Action for Chinese Patent Application No. 202010612360.2 issued by the Chinese Patent Office dated Dec. 28, 2022.

* cited by examiner

400

DATA TRANSMISSION METHODS, DATA TRANSMISSION DEVICE, AND DATA TRANSMISSION APPARATUSES

CROSS-REFERENCE TO RELATED APPLICATIONS

This application is a national phase entry under 35 USC 371 of International Patent Application No. PCT/CN2021/093859, filed on May 14, 2021, which claims priority to Chinese Patent Application No. 202010612360.2, filed on Jun. 30, 2020, which are incorporated herein by reference in their entirety.

TECHNICAL FIELD

The present disclosure relates to the field of communication, and in particular, to data transmission methods, a data transmission device, and data transmission apparatuses.

BACKGROUND

With the development of technologies, electronic devices, such as mobile phones or computers, are becoming more and more intelligent, functions thereof are more diversified, and resource sharing between different electronic devices is also becoming more and more popularized.

SUMMARY

In an aspect, a data transmission method is provided. The data transmission method includes: receiving N data packets sent by a communication opposite-end device, each data packet including a piece of target data, and N being a positive integer greater than 1; sequentially determining whether a transmission error occurs in each data packet according to a receiving sequence of the N data packets from a first data packet to an Nth data packet; if it is determined that a data packet is transmitted incorrectly, storing a piece of first indication information indicating that the data packet is transmitted incorrectly in a first queue; and after determining that the reception of the N data packets ends, generating a first retransmission instruction, and sending the first retransmission instruction to the communication opposite-end device, the first retransmission instruction including information in the first queue.

In some embodiments, each data packet further includes an identifier. If it is determined that the data packet is transmitted incorrectly, storing the piece of first indication information indicating that the data packet is transmitted incorrectly in the first queue, includes: if it is determined that the data packet is transmitted incorrectly, storing an identifier of the data packet including a piece of target data in the first queue.

In some embodiments, each data packet further includes a first check value of the piece of target data; determining whether a transmission error occurs in any data packet, includes: obtaining a second check value through calculation according to data in a received data packet; and determining whether the second check value is same as a first check value corresponding to the received data packet; if so, determine that the data packet is transmitted correctly; if not, determine that the data packet is transmitted incorrectly.

In some embodiments, sequentially determining whether the transmission error occurs in each data packet according to the receiving sequence of the N data packets from the first data packet to the Nth data packet, includes: after receiving at least one data packet and before an end of receiving the N data packets, sequentially determining whether a transmission error occurs in the at least one received data packet starting from the first data packet.

In some embodiments, sequentially determining whether the transmission error occurs in each data packet according to the receiving sequence of the N data packets from the first data packet to the Nth data packet, includes: after an end of receiving the N data packets, sequentially determining whether a transmission error occurs in the first data packet to the Nth data packet.

In some embodiments, the data transmission method further includes: before receiving the N data packets sent by the communication opposite-end device, sending a request transmission instruction to the communication opposite-end device, the request transmission instruction being configured to instruct the communication opposite-end device to send pieces of target data.

In some embodiments, determining that the reception of the N data packets ends, includes: receiving a transmission end instruction, sent by the communication opposite-end device, instructing to stop receiving data; and determining that the reception of the N data packets ends according to the transmission end instruction.

In some embodiments, the data transmission method further includes: cyclically performing following steps until it is determined that all retransmission data packets are transmitted correctly. The following steps includes: receiving M retransmission data packets sent by the communication opposite-end device, each retransmission data packet including a piece of target data to be retransmitted in a data packet corresponding to a piece of first indication information, and each retransmission data packet being used as a data packet, M being a positive integer less than or equal to N; sequentially determining whether a transmission error occurs in each data packet according to a receiving sequence of the M retransmission data packets from a first retransmission data packet to an Mth retransmission data packet; if it is determined that a data packet is transmitted incorrectly, storing another piece of first indication information in a second queue; after determining that the reception of the M retransmission data packets ends, generating a second retransmission instruction, and sending the second retransmission instruction to the communication opposite-end device, the second retransmission instruction including information in the second queue. If the second retransmission instruction includes P pieces of first indication information, a value of P is assigned to M, and a next cycle is performed; P is a positive integer.

In some embodiments, the data transmission method further includes: determining whether the first retransmission instruction includes at least one piece of first indication information; if so, sending a retransmission request instruction to the communication opposite-end device according to the first retransmission instruction, the retransmission request instruction being configured to instruct the communication opposite-end device to send at least one piece of target data to be retransmitted.

In some embodiments, the data transmission method further includes: sequentially sending S data packets to another communication opposite-end device; and after an end of sending the S data packets, receiving another first retransmission instruction from the another communication opposite-end device, and after determining that the another first retransmission instruction includes M' pieces of first indication information, sequentially sending M' retransmission data packets to the another communication opposite-end device, M' being a positive integer.

In another aspect, a data transmission method is provided. The data transmission method includes: sequentially sending N data packets to a communication opposite-end device, each data packet including a piece of target data, and N being a positive integer greater than 1; receiving a first retransmission instruction from the communication opposite-end device, the first retransmission instruction including K1 pieces of first indication information indicating that data packets are transmitted incorrectly, K1 being greater than or equal to 0, and less than or equal to N ($0 \leq K1 \leq N$), and K1 being an integer; and after determining that the K1 pieces of first indication information in the first retransmission instruction are M pieces of first indication information, sequentially sending M retransmission data packets to the communication opposite-end device according to a sequence of the M pieces of first indication information in the first retransmission instruction, each retransmission data packet including a piece of target data to be retransmitted in a data packet corresponding to a piece of first indication information, and M being a positive integer less than or equal to N.

In some embodiments, each data packet further includes an identifier, and each piece of first indication information includes an identifier in a data packet transmitted incorrectly. After determining that the first retransmission instruction includes the M pieces of first indication information, the data transmission method further includes: obtaining the piece of target data to be retransmitted corresponding to each identifier according to M identifiers; and generating the M retransmission data packets according to M pieces of target data to be retransmitted.

In some embodiments, the data transmission method further includes: before sequentially sending the N data packets to the communication opposite-end device, receiving a request transmission instruction, sent by the communication opposite-end device, instructing to send pieces of target data. Sequentially sending the N data packets to the communication opposite-end device, includes: sequentially sending the N data packets to the communication opposite-end device according to the request transmission instruction.

In some embodiments, the data transmission method further includes: before sequentially sending the M retransmission data packets to the communication opposite-end device, receiving a retransmission request instruction, sent by the communication opposite-end device, instructing to send M pieces of target data to be retransmitted. Sequentially sending the M retransmission data packets to the communication opposite-end device, includes: sequentially sending the M retransmission data packets to the communication opposite-end device according to the retransmission request instruction.

In some embodiments, the data transmission method further includes: receiving a second retransmission instruction from the communication opposite-end device, the second retransmission instruction including K2 pieces of first indication information, K2 being greater than or equal to 0, and less than or equal to M ($0 \leq K2 \leq M$), and K2 being an integer; and after determining that the K2 pieces of first indication information in the second retransmission instruction are P pieces of first indication information, sequentially sending P retransmission data packets to the communication opposite-end device according to a sequence of the P pieces of first indication information in the second retransmission instruction, each retransmission data packet including a piece of target data to be retransmitted in a data packet corresponding to a piece of first indication information, and P being a positive integer.

In yet another aspect, a data transmission device is provided. The data transmission device includes a receiving unit, a sending unit, a storage unit and a processing unit. The processing unit is coupled to the receiving unit, the sending unit and the storage unit. The receiving unit is configured to receive N data packets sent by a communication opposite-end device. Each data packet includes a piece of target data, and N is a positive integer greater than 1. The processing unit is configured to: sequentially determine whether a transmission error occurs in each data packet according to a receiving sequence of the N data packets from a first data packet to an Nth data packet; if it is determined that a data packet is transmitted incorrectly, store a piece of first indication information indicating that the data packet is transmitted incorrectly in a first queue; and generate a first retransmission instruction after determining that the reception of the N data packets ends, the first retransmission instruction including information in the first queue. The sending unit is configured to send the first retransmission instruction to the communication opposite-end device.

In some embodiments, the sending unit is further configured to sequentially send S data packets to another communication opposite-end device; S is a positive integer greater than 1. The receiving unit is further configured to receive another first retransmission instruction from the another communication opposite-end device; the first retransmission instruction includes K1 pieces of first indication information indicating that data packets are transmitted incorrectly; K1 is greater than or equal to 0, and less than or equal to S ($0 \leq K1 \leq S$), and K1 is an integer. The processing unit is further configured to, after determining that the K1 pieces of first indication information in the another first retransmission instruction are M pieces of first indication information, control the sending unit to sequentially send M retransmission data packets to the another communication opposite-end device according to a sequence of the M pieces of first indication information in the another first retransmission instruction; each retransmission data packet includes a piece of target data to be retransmitted in a data packet corresponding to a piece of first indication information, and M is a positive integer.

In yet another aspect, a data transmission apparatus is provided. The data transmission apparatus includes a storage device and a processing device. The processing device is coupled to the storage device. The storage device stores one or more computer programs therein. The processing device, when executing the one or more computer programs, performs one or more steps of the data transmission method according to some embodiments described above.

In yet another aspect, a non-transitory computer-readable storage medium is provided. The computer-readable storage medium has stored therein computer programs that, when executed by a computer, cause the computer to perform one or more steps of the data transmission method according to some embodiments described above.

In yet another aspect, a computer program product is provided. The computer program product includes computer programs that, when executed by a computer, cause the computer to perform one or more steps of the data transmission method according to some embodiments described above.

In yet another aspect, a computer program is provided. When executed by a computer, the computer program causes the computer to perform one or more steps of the data transmission method according to some embodiments described above.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings.

In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
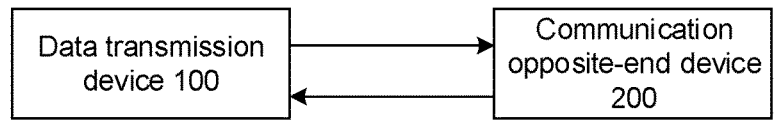
FIG. 1 is a structural diagram of a data transmission system, in accordance with embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, features defined as "first" and "second" may explicitly or implicitly include one or more of the features. In the description of the embodiments of the present disclosure, the term "a plurality of" or "the plurality of" means two or more unless otherwise specified.

In the description of some embodiments, the terms "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

For reliable connection-oriented data transmission, e.g., a transmission control protocol (TCP), the protocol itself has a check function, through which whether transmitted data has errors may be determined. For example, a sending-end device sends a data packet to a receiving-end device. In a case of determining that a transmission error occurs in the data packet, the receiving-end device will request the sending-end device to retransmit data in the data packet until the data in the data packet is transmitted correctly. After the data packet is transmitted correctly, the receiving-end device sends a response instruction indicating that the data packet is transmitted correctly to the sending-end device, and the sending-end device continues to send a next data packet to the receiving-end device. In this case, the sending-end device and the receiving-end device interact frequently at a protocol layer, resulting in a relatively low data transmission speed.

For burst transmission of a large amount of data, for example, in a transmission system of video images, since data amounts of high-definition video images are greater than those of ordinary video images, the transmission system has higher requirements on efficiency and reliability of data transmission of the high-definition video images. In this case, if the ordinary video images are transmitted by using the TCP, during the burst transmission of the high-definition video images, due to a slow data transmission speed of the transmission system, it is impossible to quickly transmit a large amount of data in burst. Thus, errors are easy to occur in the data transmission process, and data loss is also easy to occur due to limited cache. Moreover, if the data transmission process is frequently interrupted and resumed, the transmission efficiency may also be reduced, and stability of the data transmission may be affected.

Embodiments of the present disclosure provide a data transmission system 300. As shown in FIG. 1, the data transmission system 300 includes a data transmission device 100 and a communication opposite-end device 200, which are coupled to each other.

For example, the data transmission device 100 may establish a connection with the communication opposite-end device 200 in a wireless communication manner (e.g., Wireless-Fidelity (Wi-Fi) or Bluetooth). For example, the communication opposite-end device 200 is connected with a wireless router or a wireless access point (AP) in a wireless communication manner or a wired communication manner, the data transmission device 100 establishes a connection with the wireless router or the wireless AP in a wireless communication manner, and then is communicatively connected with the communication opposite-end device 200. Of course, the communication connection manner is not limited thereto in the embodiments of the present disclosure. For example, the connection between the communication opposite-end device 200 and the data transmission device 100 may also be established in a wired communication manner.

For example, a user datagram protocol (UDP) may be used between the data transmission device 100 and the communication opposite-end device 200. The sending-end device continuously sends data packets to the receiving-end device; correspondingly, the receiving-end device continuously receives the data packets. A speed at which the sending-end device sends data is determined by the sending-end device itself, and a speed at which the receiving-end device receives data is also determined by the receiving-end device itself. The transmission protocol is relatively simple, and the data transmission speed is relatively high.

The data transmission device 100 and the communication opposite-end device 200 may be applied in various scenarios. For example, the data transmission device 100 may be a desktop computer, a portable computer, a network server, a personal digital assistant (PDA), a mobile phone, a tablet computer, a wireless terminal device, an embedded device, or the like. The communication opposite-end device 200 may be a mobile phone, a tablet computer, a wearable device, a vehicle-mounted device, an augmented reality (AR)/virtual reality (VR) device, a notebook computer, an ultra-mobile personal computer (UMPC), a netbook, a PDA, or the like. Types of the data transmission device 100 and the communication opposite-end device 200 are not limited in the embodiments of the present disclosure.

Figure 2:
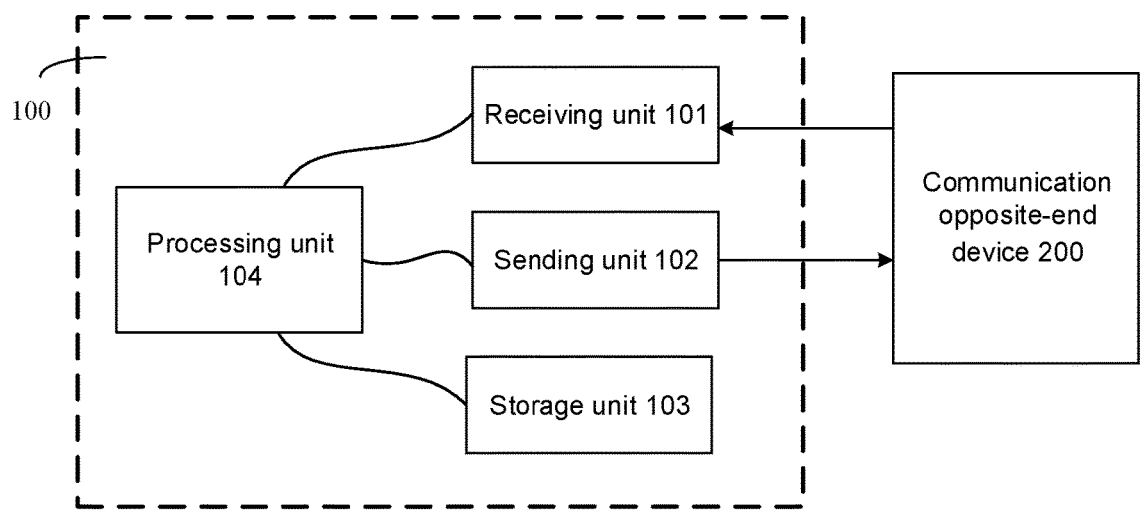
FIG. 2 is a structural diagram of another data transmission system, in accordance with embodiments of the present disclosure.

As shown in FIG. 2, the data transmission device 100 includes a receiving unit 101, a sending unit 102, a storage unit 103 and a processing unit 104. The processing unit 104 is coupled to the receiving unit 101, the sending unit 102 and the storage unit 103.

For example, the receiving unit 101, the sending unit 102, the storage unit 103 and the processing unit 104 may be provided separately or integrated together.

It can be understood that, the receiving unit 101 and the sending unit 102 are devices for information interaction between the data transmission device 100 and the communication opposite-end device 200. For example, the receiving unit 101 may receive data or instructions sent by the communication opposite-end device 200, and the sending unit 102 may send data or instructions to the communication opposite-end device 200 under control of the processing unit 104.

For example, the receiving unit 101 may be a receiver, a receiving circuit, or the like, and the sending unit 102 may be a sender, a sending circuit, or the like. For example, the receiving unit 101 and the sending unit 102 may be a wireless communication device such as Ethernet, a radio access network (RAN), a wireless local area network (WLAN), a Wi-Fi device or a Bluetooth device, or may be a wired communication device such as a universal serial bus (USB) interface. The Wi-Fi device provides the data transmission device 100 with network access following Wi-Fi-related standard protocols. The Bluetooth device may be an integrated circuit, a Bluetooth chip, or the like.

The processing unit 104 may be a processor, which may be a general-purpose central processing unit (CPU), a microprocessor, an application specific integrated circuit (ASIC), or one or more integrated circuits for controlling execution of programs of solutions of the present disclosure. The storage unit 103 may be a memory, which may be a read-only memory (ROM) or a static storage device of any other type that may store static information and instructions, a random access memory (RAM) or a dynamic storage device of any other type that may store information and instructions, an electrically erasable programmable read-only memory (EEPROM), a compact disc read-only memory (CD-ROM) or any other compact disc storage or optical disc storage (including a compact disc, a laser disc, an optical disc, a digital versatile disc or a Blue-ray disc), a magnetic disc storage medium or any other magnetic storage device, or any other medium that may be used to carry or store desired program codes in a form of instructions or data structures and that may be accessed by a computer, but is not limited thereto.

Embodiments of the present disclosure provide a data transmission method. The data transmission method may be implemented by the data transmission device 100 and the communication opposite-end device 200 in FIGS. 1 and 2.

It will be noted that, in a case of transmitting a normal amount of data between the data transmission device 100 and the communication opposite-end device 200, the amount of data to be transmitted is relatively small, and the data transmission device 100 and the communication opposite-end device 200 may use the TCP, the UDP or the data transmission method in the embodiments of the present disclosure for data transmission. In a case of burst transmitting a large amount of data between the data transmission device 100 and the communication opposite-end device 200, the amount of data to be transmitted is relatively large, and the data transmission device 100 and the communication opposite-end device 200 may use the data transmission method in the embodiments of the present disclosure for data transmission.

Hereinafter, the data transmission method provided by the embodiment of the present disclosure will be described in detail with reference to FIG. 3.

Figure 3:
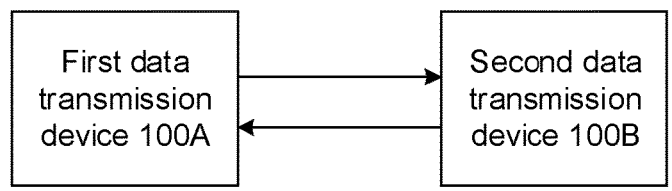
FIG. 3 is a structural diagram of yet another data transmission system, in accordance with embodiments of the present disclosure.

It will be noted that, the data transmission system 300 in FIG. 3 includes two data transmission devices, which are a first data transmission device 100A and a second data transmission device 100B, and the first data transmission device 100A and the second data transmission device 100B communicate with each other. The first data transmission device 100A may serve as a communication opposite-end device 200 of the second data transmission device 100B, and the second data transmission device 100B may serve as a communication opposite-end device 200 of the first data transmission device 100A.

Figure 4:
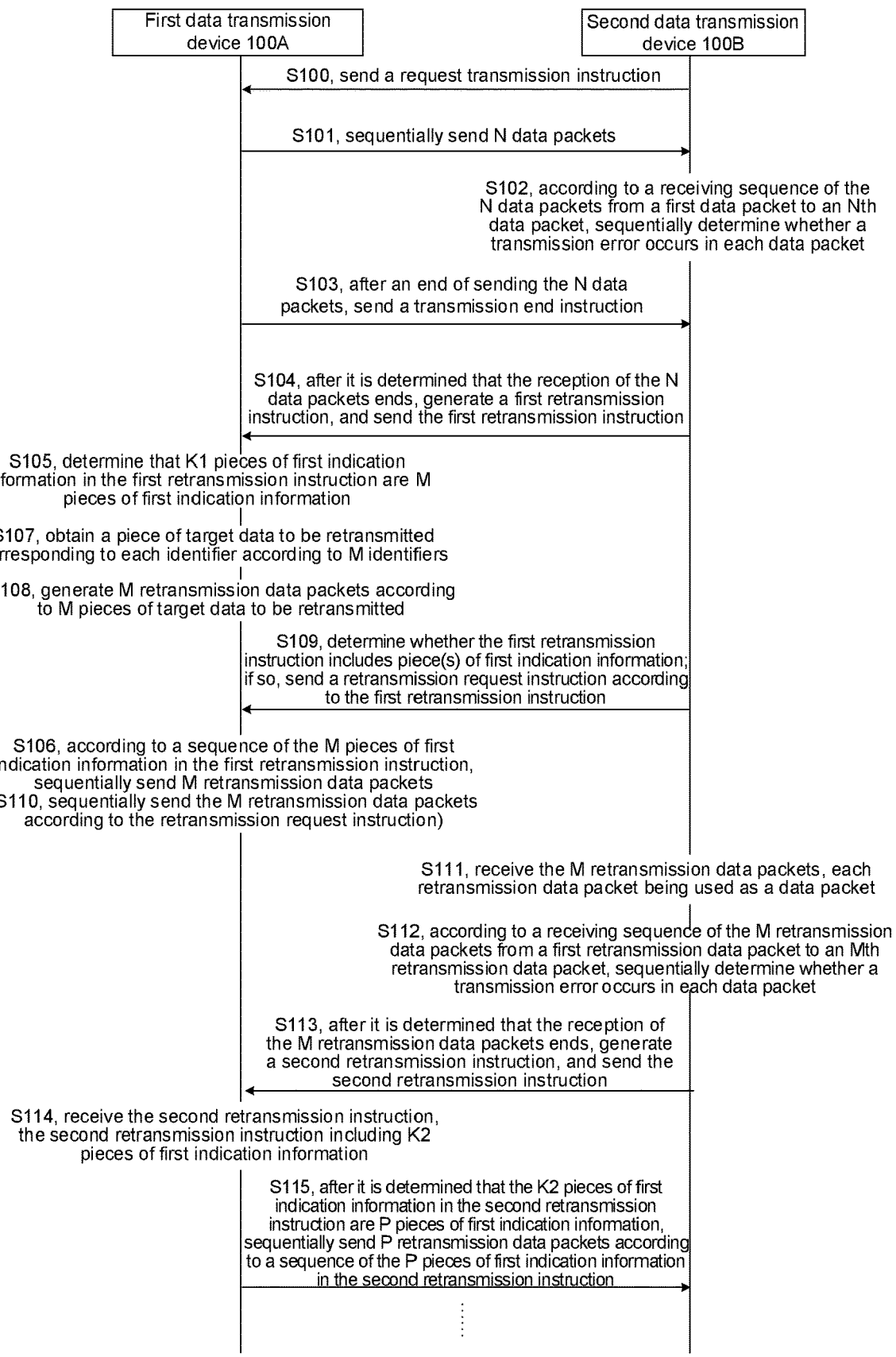
FIG. 4 is a flow diagram of a data transmission method, in accordance with embodiments of the present disclosure.

Referring to FIG. 4, the data transmission method includes the following steps.

In S100, the second data transmission device 100B sends a request transmission instruction to the first data transmission device 100A.

The request transmission instruction is configured to instruct the communication opposite-end device 200 to send pieces of target data. For example, the second data transmission device 100B and the first data transmission device 100A are the communication opposite-end devices 200 of each other. In this case, the communication opposite-end device 200 (i.e., the first data transmission device 100A) receiving the request transmission instruction sends the pieces of target data to the communication opposite-end device 200 (i.e., the second data transmission device 100B) sending the request transmission instruction.

In S101, the first data transmission device 100A sequentially sends N data packets to the second data transmission device 100B. Each data packet includes a piece of target data, and N is a positive integer greater than 1. Correspondingly, the second data transmission device 100B receives the N data packets.

It will be noted that, in a case where the first data transmission device 100A and the second data transmission device 100B use the TCP or the UDP for transmission of the normal amount of data, if there is burst transmission of the large amount of data, the first data transmission device 100A may determine whether the amount of data to be transmitted is a large amount of data before sequentially sending the N data packets, and if so, the first data transmission device 100A uses the data transmission method in the embodiments of the present disclosure for transmission of the large amount of data. Before the first data transmission device 100A sequentially sends the N data packets to the second data transmission device 100B, the first data transmission device 100A determines whether the amount of data to be sent is a large amount of data. For example, the first data transmission device 100A determines a size of the amount of data in a task to be sent, and determines that the amount of data to be sent is the large amount of data if the size of the amount of data exceeds a preset byte of data (e.g., 15M Byte). The preset byte data may be set according to actual situations, which is not limited here. If the amount of data to be sent is the large amount of data, the first data transmission device 100A generates N data packets according to data in the amount of data to be sent.

For example, the data packets may be messages.

It will be noted that, a length of the data packet transmitted between the data transmission device 100 and the communication opposite-end device 200 may be designed according to actual situations, such as buffer capacities of the data transmission device 100 and the communication opposite-end device 200, or sizes of network cards of the data transmission device 100 and the communication opposite-end device 200, which is not limited in the present disclosure here. For example, lengths of the data packets may be less than or equal to 65536 bytes.

For example, the first data transmission device 100A may divide data of a frame image into N data packets, and then sequentially send the N data packets to the second data transmission device 100B.

The second data transmission device 100B is used as the communication opposite-end device 200 of the first data transmission device 100A in the data transmission process, and the first data transmission device 100A is used as the communication opposite-end device 200 of the second data transmission device 100B in the data transmission process.

For example, data content of the pieces of target data may be classified into different types of data content. For example, the data content may include numbers, texts and other types of data content.

In addition, the communication opposite-end device 200 may transmit pieces of encrypted target data to the data transmission device 100. For example, the first data transmission device 100A may encrypt the pieces of target data by using an advanced encryption standard (AES), and then send the pieces of encrypted target data to the second data transmission device 100B. Of course, the first data transmission device 100A may also encrypt the pieces of target data through other encryption methods for encrypted transmission, and the encryption method is not limited in the embodiments of the present disclosure.

It will be noted that, before the first data transmission device 100A sequentially sends the N data packets to the second data transmission device 100B, the first data transmission device 100A sends a transmission request instruction to the second data transmission device 100B to indicate the second data transmission device 100B to receive the N data packets. Then, the second data transmission device 100B sends a transmission confirmation instruction to the first data transmission device 100A to instruct the first data transmission device 100A to start to sequentially send the N data packets.

For example, before formal transmission of the N data packets, the first data transmission device 100A sends the transmission request instruction used as handshake synchronization to the second data transmission device 100B, so as to inform the second data transmission device 100B that data will be transmitted in a burst transmission mode.

Information of the transmission request instruction includes a burst transmission mode identification field, a data packet number field, a single packet data amount field, a total data amount field, and a sending direction field. After receiving the handshake information (i.e., the transmission request instruction) from the first data transmission device 100A, the second data transmission device 100B enters a fast receiving mode of a large amount of data, and then sends the received handshake data packet (i.e., the information of the transmission request instruction), in which the sending direction field has been modified (e.g., the sending direction field sent by the first data transmission device 100A is 0, and a sending direction field modified by the second data transmission device 100B is 1), to the first data transmission device 100A. The received handshake data packet in which the sending direction field has been modified is as the transmission confirmation instruction for confirming a fast transmission request instruction. After receiving the transmission confirmation instruction from the second data transmission device 100B, the first data transmission device 100A formally starts to transmit the N data packets.

In S102, the second data transmission device 100B sequentially determines whether a transmission error occurs in each data packet according to a receiving sequence of the N data packets from a first data packet to an Nth data packet.

If it is determined that the data packet is transmitted incorrectly, a piece of first indication information indicating that the data packet is transmitted incorrectly is stored in a first queue.

In a case where the second data transmission device 100B determines that the data packet is transmitted incorrectly, the piece of target data in the data packet transmitted incorrectly is not stored, and the piece of first indication information is stored in the first queue.

In addition, In a case where the second data transmission device 100B determines that the data packet is transmitted correctly, only the piece of target data in the data packet transmitted correctly may be stored; or, while the piece of target data is stored, second indication information indicating that the data packet is transmitted correctly may also be stored in a confirmation reception queue. Storage locations of the confirmation reception queue and the first queue are different.

It will be noted that, a storage location of the piece of target data and the storage location of the first queue may be selected according to actual situations, which are not limited in the embodiments of the present disclosure. For example, the second data transmission device 100B may include at least two memories, in which one memory is used to store the piece of target data in the data packet transmitted correctly, and the other memory has the first queue therein. Alternatively, the piece of target data and the first queue may be stored in different storage spaces of a same memory in the second data transmission device 100B.

For example, the data packet further includes a first check value of a piece of target data.

Figure 5:
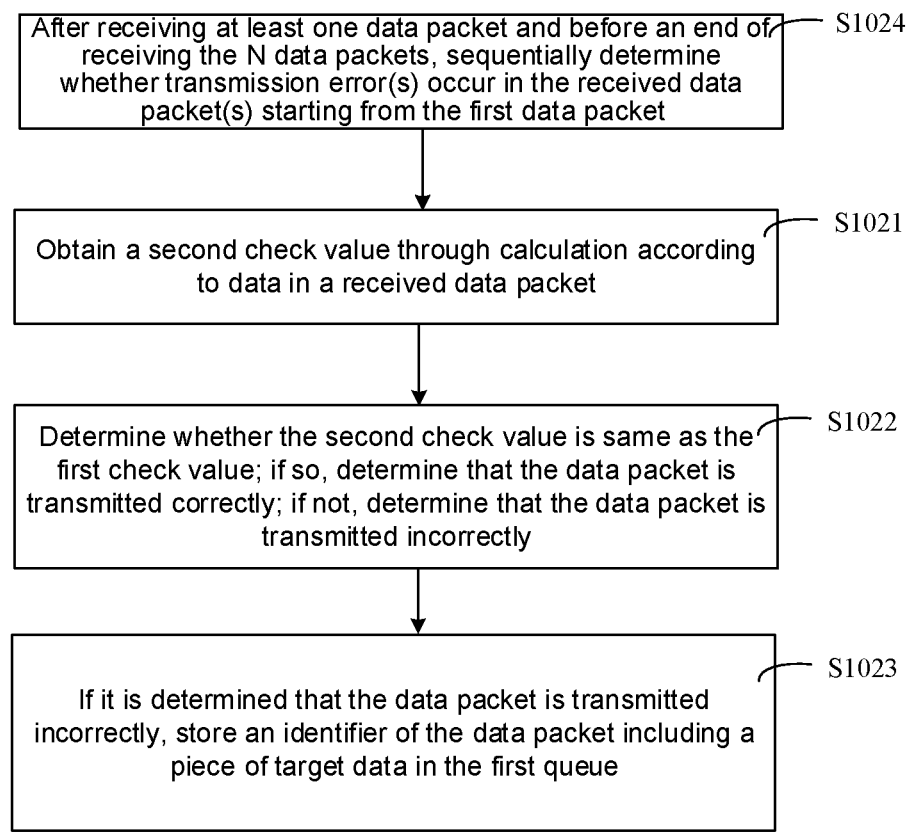
FIG. 5 is a flow diagram of another data transmission method, in accordance with embodiments of the present disclosure.

In this case, determining, by the second data transmission device 100B, whether a transmission error occurs in any data packet, as shown in FIG. 5, includes:

in S1021, obtaining a second check value through calculation according to data in the received data packet; and in S1022, determining whether the second check value is same as the first check value. If so, it is determined that the data packet is transmitted correctly; if not, it is determined that the data packet is transmitted incorrectly.

It will be noted that, the data in the received data packet refers to data, actually received by the second data transmission device 100B, in the data packet sent by the first data transmission device 100A. The data in the received data packet may be the piece of target data or a part of the piece of target data, or may not be the piece of target data.

For example, the first check value may be a checksum of the piece of target data in the data packet. In this case, after the second data transmission device 100B receives the data packet sent by the first data transmission device 100A, the second check value is obtained through calculation according to the data in the received data packet, and the second check value may be a checksum of the data in the received packet. The second data transmission device 100B compares the checksum of the piece of target data in the data packet with the checksum of the data in the received data packet. If they are different, the second data transmission device 100B determines that the data packet is transmitted incorrectly, and the second data transmission device 100B does not receive the piece of target data in the correct data packet, and the transmission of the data packet fails.

For example, the data packet further includes an identifier. The identifier is identification information of the data packet, such as a transmission sequence number of the data packet, and the piece of target data in the data packet where the identifier is located may be found through the identifier. For example, a type of the identifier may be number(s) or a string.

In this case, if the second data transmission device 100B determines that the data packet is transmitted incorrectly, storing the piece of first indication information indicating that the data packet is transmitted incorrectly in the first queue, as shown in FIG. 5, includes:

in S1023, if it is determined that the data packet is transmitted incorrectly, storing the identifier of the data packet including the piece of target data in the first queue.

In this case, the piece of first indication information is the identifier of the data packet transmitted incorrectly.

It will be noted that, in a case where the N data packets are all transmitted incorrectly, the first queue includes N pieces of first indication information, i.e., N identifiers. In a case where the N data packets are all transmitted correctly, there is no first indication information in the first queue. In this case, information in the first queue may be an invalid string or an empty string. When identifying the invalid string, the second data transmission device 100B will not identify it as an identifier, since data content of the invalid string is different from data content of the identifier.

In addition, in the case where the second data transmission device 100B determines that the data packet is transmitted correctly, the identifier of the data packet transmitted correctly may be stored in the confirmation reception queue.

For example, sequentially determining, by the second data transmission device 100B, whether the transmission error occurs in each data packet according to the receiving sequence of the N data packets from the first data packet to the Nth data packet, as shown in FIG. 5, includes the following step.

In S1024, after receiving at least one data packet and before an end of receiving the N data packets, it is sequentially determined, starting from the first data packet, whether transmission error(s) occur in the received data packets.

In this case, the second data transmission device 100B may determine whether a transmission error occurs in a data packet after receiving the data packet, and may receive a next data packet while determining whether a transmission error occurs in each data packet. For example, the second data transmission device 100B determines whether a transmission error occurs in the first data packet after receiving the first data packet, and receives a second data packet while determining whether the transmission error occurs in the first data packet.

Alternatively, after receiving F data packets, the second data transmission device 100B may sequentially determine, starting from the first data packet, whether transmission error(s) occur in the first data packet to an Fth data packet (F being an integer greater than 1 and less than N), and receive a (F+1)th data packet while determining whether a transmission error occurs in the first data packet. For example, the second data transmission device 100B may sequentially determine, starting from the first data packet after receiving three data packets, whether transmission error(s) occur in the first data packet to a third data packet, and receive a fourth data packet while determining whether the transmission error occurs in the first data packet.

In this way, the data transmission device 100 may simultaneously receive a data packet and determine whether a transmission error occurs in a data packet, so that time for the data transmission device 100 to generate the first queue may be shortened, and the communication opposite-end device 200 may send piece(s) of target data to be retransmitted to the data transmission device 100 fast. As a result, it may be possible to increase a speed of the data transmission between the data transmission device 100 and the communication opposite-end device 200, and save data transmission time. Moreover, in a case where the number of the data packets is relatively large, it may be possible to save time for determining whether transmission error(s) occur in all the data packets, and in turn increase the data transmission speed.

It will be noted that, in a case where each time the data transmission device 100 receives a data packet, it determines whether a transmission error occurs in the data packet, the data transmission device 100 stores the piece of target data in the data packet transmitted correctly, and reserves a storage location of the data packet transmitted incorrectly. For example, if the first data packet is transmitted correctly, a piece of target data in the first data packet is stored in a storage location of the first data packet; if the second data packet is transmitted incorrectly, a storage location of a piece of target data in the second data packet is reserved; if the third data packet is transmitted correctly, the storage location of the piece of target data in the second data packet is reserved, and a piece of target data in the third data packet is stored in a storage location of the third data packet. Thereafter, if the communication opposite-end device 200 sends a piece of target data to be retransmitted corresponding to the second data packet to the data transmission device 100 according to the piece of target data corresponding to the second data packet, and if the data transmission device 100 determines that the transmission is correct, the piece of target data to be retransmitted corresponding to the second data packet is stored in the storage location of the second data packet.

Figure 6:
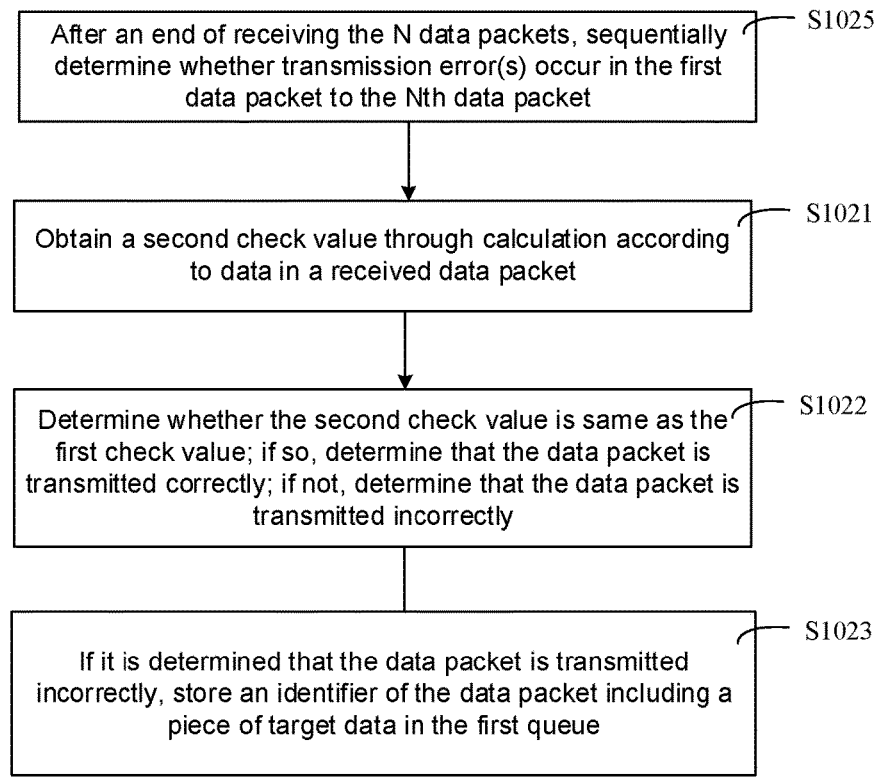
FIG. 6 is a flow diagram of yet another data transmission method, in accordance with embodiments of the present disclosure.

Alternatively, as shown in FIG. 6, in S1025, after the end of receiving the N data packets, it is sequentially determined whether transmission error(s) occur in the first data packet to the Nth data packet.

In this case, the data transmission device 100 receiving the data packets and the data transmission device 100 determining whether transmission error(s) occur in the data packets are performed separately. Therefore, it may be possible to avoid interference of a process of determining whether transmission error(s) occur in the data packets to a process of receiving the data packets, and avoid interference of the process of receiving the data packets to the process of determining whether transmission error(s) occur in the data packets.

It will be noted that, in a case where only after receiving the F data packets or the N data packets, the data transmission device 100 determines whether transmission error(s) occur in the data packets, the data transmission device 100 stores data in the received data packets. For example, the data transmission device 100 sequentially stores data in the first data packet to the Fth data packet, or data in the first data packet to the Nth data packet. In a process of sequentially determining whether transmission error(s) occur in the received data packets, if there are data packet(s) transmitted incorrectly, such as the third data packet and a (F−1)th data packet, the data transmission device 100 deletes stored data in the third data packet and the (F−1)th data packet, and reserves the storage location of the third data packet and a storage location of the (F−1)th data packet. Thereafter, if the communication opposite-end device 200 sends a piece of target data to be retransmitted corresponding to the third data packet and a piece of target data to be retransmitted corresponding to the Fth data packet to the data transmission device 100 according to the piece of target data corresponding to the third data packet and the piece of target data corresponding to the Fth data packet, and if the data transmission device 100 determines that they are both transmitted correctly, the piece of target data corresponding to the third data packet is stored in the storage location of the third data packet, and the piece of target data corresponding to the Fth data packet is stored in the storage location of the Fth data packet.

In S103, after an end of sending the N data packets, the first data transmission device 100A sends a transmission end instruction to the second data transmission device 100B. The transmission end instruction instructs the second data transmission device 100B to stop receiving data. Correspondingly, the second data transmission device 100B determines that the reception of the N data packets ends according to the transmission end instruction.

It will be noted that, after an end of sending data packets or retransmitted data packet(s) by the first data transmission device 100A to the second data transmission device 100B, the first data transmission device 100A sends the transmission end instruction to the second data transmission device 100B.

In S104, after determining that the reception of the N data packets ends, the second data transmission device 100B generates a first retransmission instruction, and sends the first retransmission instruction to the first data transmission device 100A. The first retransmission instruction includes the information in the first queue.

The first retransmission instruction includes K1 pieces of first indication information indicating that data packets are transmitted incorrectly, where K1 is greater than or equal to 0, and less than or equal to N (0K1N), and K1 is an integer.

For example, a type of the first retransmission instruction may be a data packet, in which case the information in the first queue may be used as data included in the data packet. The data packet may also be used as a message.

It can be understood that, if the N data packets are all transmitted correctly, the first retransmission instruction includes no first indication information; if the N data packets are all transmitted incorrectly, the first retransmission instruction includes only the pieces of first indication information, and the number of the pieces of first indication information is N; in a case where a part of the N data packets are transmitted correctly, and a remaining part of the N data packets are transmitted incorrectly, the number of pieces of first indication information included in the first retransmission instruction is the number of the data packets transmitted incorrectly.

In S105, the first data transmission device 100A determines that the K1 pieces of first indication information in the first retransmission instruction are M pieces of first indication information.

M is a positive integer.

It will be noted that, in a case where the first data transmission device 100A determines that the K1 pieces of first indication information in the first retransmission instruction are the M pieces of first indication information (i.e., K1=M), i.e., in a case where the number of the pieces of first indication information is not zero, the first data transmission device 100A performs retransmission, and sends pieces of target data to be retransmitted to the second data transmission device 100B; in a case of determining that there is no first indication information in the first retransmission instruction, i.e., in a case where the number of the pieces of first indication information is zero (i.e., K1=0), the first data transmission device 100A does not perform retransmission, and ends the transmission.

In S106, M retransmission data packets are sequentially sent to the second data transmission device 100B according to a sequence of the M pieces of first indication information in the first retransmission instruction.

Each retransmission data packet includes a piece of target data to be retransmitted in a data packet corresponding to a piece of first indication information.

It can be understood that, the retransmission data packet(s) are sent only after it is determined that the number of the pieces of first indication information in the first retransmission instruction is not zero, and M is less than or equal to N.

The sequence of the M pieces of first indication information is a determination sequence of the M data packets transmitted incorrectly.

For example, in a process of determining whether transmission error(s) occur in the first data packet to the Nth data packet, if transmission errors occur in the second data packet, the fourth data packet and the sixth data packet, and remaining data packets are all transmitted correctly, the first retransmission instruction includes three pieces of first indication information, a sequence of which is a determination sequence of the second data packet, the fourth data packet and the sixth data packet. That is, in the three pieces of first indication information, a first piece of first indication information indicates a transmission error of the second data packet, a second piece of first indication information indicates a transmission error of the fourth data packet, and a third piece of first indication information indicates a transmission error of the sixth data packet. Thereafter, the first data transmission device 100A sequentially sends three retransmission data packets to the second data transmission device 100B. That is, a first retransmission data packet includes a piece of target data in the second data packet corresponding to the first piece of first indication information, a second retransmission data packet includes a piece of target data in the fourth data packet corresponding to the second piece of first indication information, and a third retransmission data packet includes a piece of target data in the sixth data packet corresponding to the third piece of first indication information.

For example, the data packet further includes the identifier, and a piece of first indication information includes an identifier of a data packet transmitted incorrectly. In this case, after the first data transmission device 100A determines that the first retransmission instruction includes M pieces of first indication information, the data transmission method further includes the following steps.

In S107, a piece of target data to be retransmitted corresponding to each identifier is obtained according to M identifiers.

In S108, M retransmission data packets are generated according to M pieces of target data to be retransmitted.

It can be understood that, the M identifiers are identifiers of the M data packets transmitted incorrectly in the transmitted N data packets, and the first data transmission device 100A obtains the pieces of target data corresponding to the M data packets transmitted incorrectly according to the M identifiers, i.e., the M pieces of target data to be retransmitted. Then, in a case where the M pieces of target data to be retransmitted need to be sent, the first data transmission device 100A generates the M retransmission data packets according to the M pieces of target data to be retransmitted.

It will be noted that, an identifier of a data packet transmitted incorrectly corresponding to a piece of target data to be retransmitted is different from an identifier of a retransmission data packet including the piece of target data to be retransmitted, but the two different identifiers both correspond to a same piece of target data.

In S109, the second data transmission device 100B determines whether the first retransmission instruction includes piece(s) of first indication information. If so, a retransmission request instruction is sent to the first data transmission device 100A according to the first retransmission instruction. Correspondingly, the first data transmission device 100A receives the retransmission request instruction sent by the second data transmission device 100B to instruct to send the piece(s) of target data to be retransmitted.

The retransmission request instruction is configured to instruct the first data transmission device 100A (i.e., the communication opposite-end device 200) to send the pieces of target data to be retransmitted.

In this case, sequentially sending, by the first data transmission device 100A, the M retransmission data packets to the second data transmission device 100B, includes:

in S110, sequentially sending, by the first data transmission device 100A, the M retransmission data packets to the second data transmission device 100B according to the retransmission request instruction.

It can be understood that, in a case where the piece of first indication information includes the identifier of the data packet transmitted incorrectly, the first data transmission device 100A generates M retransmission data packets according to the M pieces of target data to be retransmitted, and sequentially sends the M retransmission data packets to the second data transmission device 100B according to a sequence of the M identifiers. The sequence of the M identifiers may be a sequence in which the second data transmission device 100B receives the M data packets transmitted incorrectly, or a sequence in which the second data transmission device 100B determines the M data packets transmitted incorrectly, or a sequence in which the first data transmission device 100A sends the M data packets transmitted incorrectly.

It will be noted that, before the first data transmission device 100A sequentially sends the M retransmission data packets to the second data transmission device 100B, the first data transmission device 100A sends a transmission request instruction to the second data transmission device 100B to instruct the second data transmission device 100B to receive the M retransmission data packets. Then, the second data transmission device 100B sends a transmission confirmation instruction to the first data transmission device 100A to instruct the first data transmission device 100A to start to sequentially send the M first retransmission packets.

In addition, in some embodiments, after the second data transmission device 100B sends the first retransmission instruction to the first data transmission device 100A, and the first data transmission device 100A determines that the first retransmission instruction includes M pieces of first indication information, the first data transmission device 100A sequentially sends the M retransmission data packets to the second data transmission device 100B. Correspondingly, the second data transmission device 100B receives the M retransmission data packets sequentially sent by the first data transmission device 100A.

In some embodiments, as shown in FIG. 4, the following steps are cyclically performed until the second data transmission device 100B determines that all the retransmission data packets are transmitted correctly.

In S111, the second data transmission device 100B receives the M retransmission data packets sent by the first data transmission device 100A, and uses each retransmission data packet as a data packet. Each retransmission data packet includes a piece of target data to be retransmitted in a data packet corresponding to a piece of first indication information. M is a positive integer.

In S112, the second data transmission device 100B sequentially determines whether a transmission error occurs in each data packet according to the receiving sequence of the M retransmission data packets from a first retransmission data packet to an Mth retransmission data packet.

If it is determined that a data packet is transmitted incorrectly, a piece of first indication information corresponding thereto is stored in a second queue.

It will be noted that, after sending the first retransmission instruction including the information in the first queue to the first data transmission device 100A, the second data transmission device 100B may delete the information in the first queue. Then, information in the second queue may be stored in the storage location of the first queue; that is, the information in the first queue is updated to the information in the second queue.

In S113, after determining that the reception of the M retransmission data packets ends, the second data transmission device 100B generates a second retransmission instruction, and sends the second retransmission instruction to the first data transmission device 100A. The second retransmission instruction includes the information in the second queue. Correspondingly, the first data transmission device 100A receives the second retransmission instruction.

It can be understood that, after an end of sending the M retransmission data packets, the first data transmission device 100A sends a transmission end instruction to the second data transmission device 100B, and the second data transmission device 100B determines that the reception of the M retransmission data packets ends according to the transmission end instruction.

It will be noted that, if the second retransmission instruction includes no first indication information, that is, all the retransmission data packets are transmitted correctly and the number of the pieces of first indication information is zero, the cycle ends and no more data is retransmitted. In this case, the second data transmission device 100B receives the pieces of target data in the correct N data packets.

In S114, the first data transmission device 100A receives the second retransmission instruction from the second data transmission device 100B, and the second retransmission instruction includes K2 pieces of first indication information, where K2 is greater than or equal to 0, and less than or equal to M (0≤K2≤M), and K2 is an integer.

In S115, after determining that the K2 pieces of first indication information in the second retransmission instruction are P pieces of first indication information, the first data transmission device 100A sequentially sends P retransmission data packets to the second data transmission device 100B according to a sequence of the P pieces of first indication information in the second retransmission instruction. Each retransmission data packet includes a piece of target data to be retransmitted in a data packet corresponding to a piece of first indication information.

P is a positive integer.

It can be understood that, in a case where the first data transmission device 100A determines that the K2 pieces of first indication information in the second retransmission instruction are P pieces of first indication information (i.e., K2=P), i.e., in a case where the number of the pieces of first indication information is not zero, the first data transmission device 100A performs retransmission, and sends piece(s) of target data to be retransmitted to the second data transmission device 100B; in a case of determining that there is no first indication information in the second retransmission instruction, i.e., in a case where the number of the pieces of first indication information is zero (i.e., K2=0), the first data transmission device 100A does not perform retransmission, and ends the transmission.

It will be noted that, if the second retransmission instruction includes P pieces of first indication information, a value of P is assigned to M, and S111 to S115 are cyclically performed until the circle ends after it is determined that the number of the pieces of first indication information in the second retransmission instruction is zero, or after it is determined that there is no first indication information in the second retransmission instruction.

It can be understood that, before the first data transmission device 100A sends the P retransmission data packets to the second data transmission device 100B, the second data transmission device 100B sends another retransmission request instruction to the first data transmission device 100A after determining that the number of the pieces of first indication information in the second retransmission instruction is not zero. The first data transmission device 100A sends the retransmission data packet(s) to the second data transmission device 100B according to the retransmission request instruction. In addition, in a case where the second data transmission device 100B determines that the P retransmission data packets are transmitted correctly, the second retransmission instruction sent by the second data transmission device 100B to the first data transmission device 100A includes no first indication information, and information of the second retransmission instruction may be an invalid string or an empty string, and the first data transmission device 100A does not identify a piece of first indication information. Then, the first data transmission device 100A ends the retransmission. In this case, the second data transmission device 100B does not identify the piece of first indication information either, and thus the second data transmission device 100B does not send a retransmission request instruction to the first data transmission device 100A.

To sum up, in the data transmission method provided by the embodiments of the present disclosure, the data transmission device 100 receives the N data packets sequentially sent by the communication opposite-end device 200, each data packet including the piece of target data, and sequentially determines whether transmission error(s) occur in the N data packets; if it is determined that data packet(s) are transmitted incorrectly, piece(s) of first indication information indicating that the data packet(s) are transmitted incorrectly are stored in the first queue; after determining that the reception of the N data packets ends, the data transmission device 100 generates a first retransmission instruction, and sends the first retransmission instruction to the communication opposite-end device 200, the first retransmission instruction including the information in the first queue. In addition, after determining that the first retransmission instruction includes the piece(s) of first indication information, the communication opposite-end device 200 sends the piece(s) of target data to be retransmitted to the data transmission device 100.

Therefore, compared with the reliable connection-oriented data transmission, the communication opposite-end device 200 in the embodiments of the present disclosure continuously sends the N data packets, and the data transmission device 100 continuously receives the N data packets. After sending a data packet, the communication opposite-end device 200 does not need to wait for receiving a response instruction indicating that the data packet is transmitted correctly sent by the data transmission device 100 before sending a next data packet, and the communication opposite-end device 200 sends the piece(s) of target data to be retransmitted only after the end of sending the N data packets. In this way, it may be possible to reduce the number of interactions between the data transmission device 100 and the communication opposite-end device 200 at the protocol layer, simplify a communication interaction process of the transmission protocol, improve the data transmission speed, avoid frequent interruption and recovery during the transmission of the data packets, and improve stability of the data transmission.

Moreover, for data transmission (e.g., unreliable connection-oriented data transmission) without a verification mechanism during data transmission, retransmission is not performed in a case where errors occur in the data transmission, which may easily lead to errors in the data transmission, and in turn lead to low reliability of the data transmission. Compared with the data transmission without the verification mechanism, the data transmission between the data transmission device 100 and the communication opposite-end device 200 in the embodiments of the present disclosure has a verification mechanism, which may avoid errors in the data transmission, and improve the accuracy and the reliability of the data transmission, and be applicable to communication occasions with relatively high requirements on data reliability. Therefore, the data transmission method in the embodiments of the present disclosure is more applicable to the burst transmission of the large amount of data.

In addition, in the data transmission method in the embodiments of the present disclosure, the data transmission device 100 may perform parallel execution of receiving a data packet and determining whether the transmission error occurs in a data packet.

Consequently, it may be possible to improve a processing speed of the data transmission device 100, reduce cache and memory resource consumption of the data transmission device 100, improve the speed of the data transmission between the data transmission device 100 and the communication opposite-end device 200, and improve the efficiency and the reliability of the data transmission in a case of the large amount of data.

Figure 7:
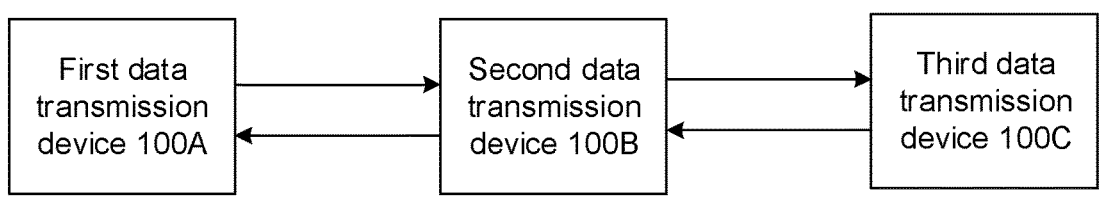
FIG. 7 is a structural diagram of yet another data transmission system, in accordance with embodiments of the present disclosure.

In some embodiments, as shown in FIG. 7, the data transmission system 300 further includes a third data transmission device 100C, and the second data transmission device 100B and the third data transmission device 100C communicate with each other. In this case, the second data transmission device 100B may serve as a communication opposite-end device 200 of the third data transmission device 100C, and the third data transmission device 100C may serve as a communication opposite-end device 200 of the second data transmission device 100B.

Hereinafter, the data transmission method provided by the embodiments of the present disclosure will be described in detail with reference to FIG. 7.

It will be noted that, the second data transmission device 100B sequentially sends S data packets to the third data transmission device 100C. Each data packet includes a piece of target data, and S is a positive integer greater than 1. S and N may be equal or unequal. For convenience of description, the data transmission method between the second data transmission device 100B and the third data transmission device 100C will be described below by considering an example in which S and N are equal.

Figure 8:
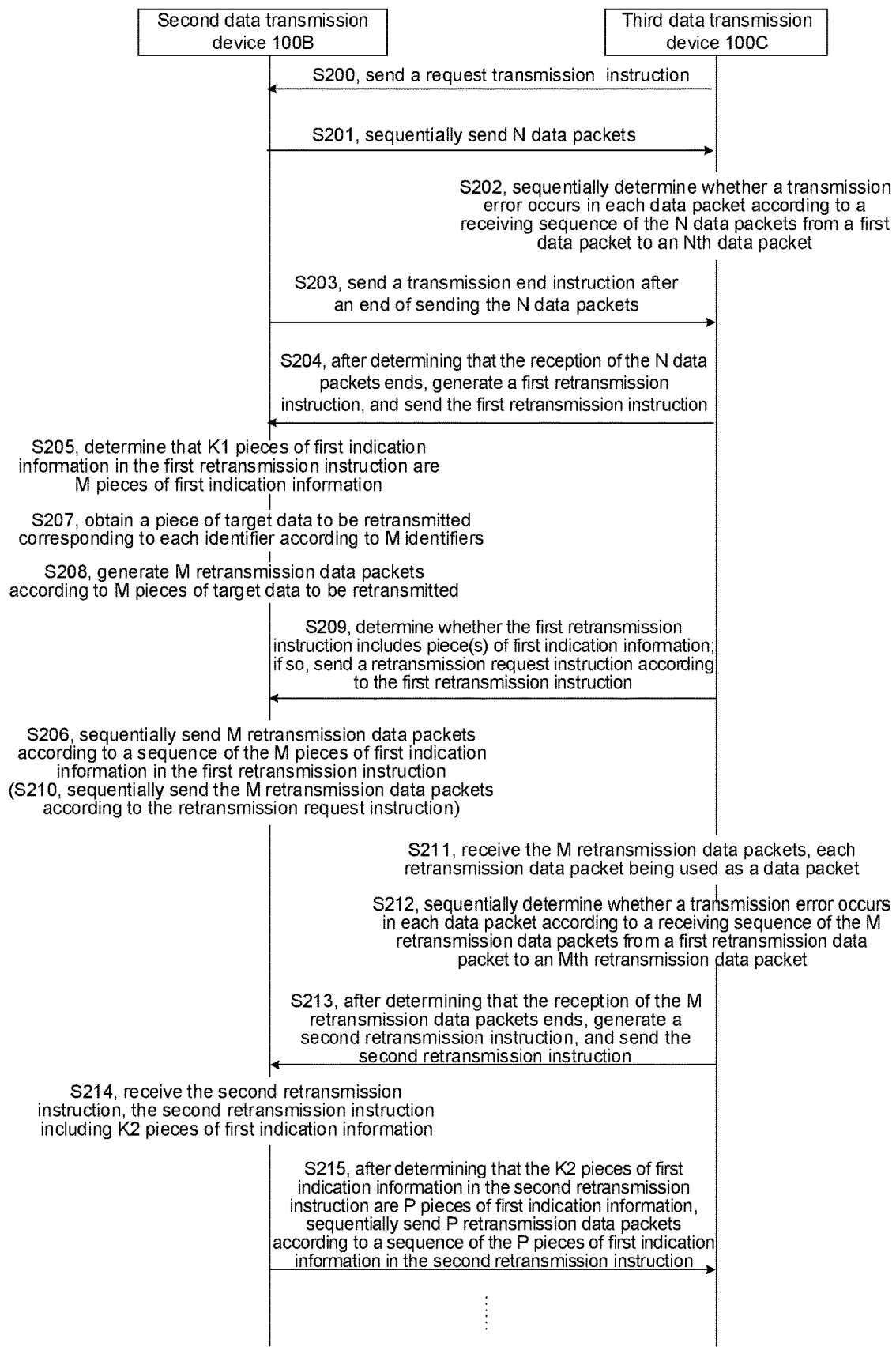
FIG. 8 is a flow diagram of yet another data transmission method, in accordance with embodiments of the present disclosure.

Referring to FIG. 8, the data transmission method includes following steps.

In S200, the third data transmission device 100C sends a request transmission instruction to the second data transmission device 100B.

The request transmission instruction is configured to instruct the communication opposite-end device 200 to send pieces of target data. For example, the third data transmission device 100C and the second data transmission device 100B are the communication opposite-end devices 200 of each other. In this case, the communication opposite-end device 200 (i.e., the second data transmission device 100B) receiving the request transmission instruction sends the pieces of target data to the communication opposite-end device 200 (i.e., the third data transmission device 100C) sending the request transmission instruction.

In S201, the second data transmission device 100B sequentially sends N data packets to the third data transmission device 100C. Each data packet includes a piece of target data, and N is a positive integer greater than 1. Correspondingly, the third data transmission device 100C receives the N data packets.

In S202, the third data transmission device 100C sequentially determines whether a transmission error occurs in each data packet according to a receiving sequence of the N data packets from a first data packet to an Nth data packet.

If it is determined that the data packet is transmitted incorrectly, a piece of first indication information indicating that the data packet is transmitted incorrectly is stored in a first queue.

For example, the data packet further includes a first check value of a piece of target data.

In this case, determining, by the third data transmission device 100C, whether a transmission error occurs in any data packet, referring to FIG. 5, includes:

in S1021, obtaining a second check value through calculation according to data in the received data packet; and in S1022, determining whether the second check value is same as the first check value. If so, it is determined that the data packet is transmitted correctly; if not, it is determined that the data packet is transmitted incorrectly.

For example, the data packet further includes an identifier. In this case, if the third data transmission device 100C determines that the data packet is transmitted incorrectly, storing the piece of first indication information indicating that the data packet is transmitted incorrectly in the first queue, referring to FIG. 5, includes:

in S1023, if it is determined that the data packet is transmitted incorrectly, storing the identifier of the data packet including the piece of target data in the first queue.

For example, sequentially determining, by the third data transmission device 100C, whether the transmission error occurs in each data packet according to the receiving sequence of the N data packets from the first data packet to the Nth data packet, includes:

referring to FIG. 5, in S1024, after receiving at least one data packet and before an end of receiving the N data packets, sequentially determining, starting from the first data packet, whether transmission error(s) occur in the received data packets;

or, referring to FIG. 6, in S1025, after the end of receiving the N data packets, sequentially determining, by the third data transmission device 100C, whether transmission error (s) occur in the first data packet to the Nth data packet.

In this case, as shown in FIG. 8, in S203, the second data transmission device 100B sends a transmission end instruction to the third data transmission device 100C after an end of sending the N data packets. The transmission end instruction instructs the third data transmission device 100C to stop receiving data. Correspondingly, the third data transmission device 100C determines that the reception of the N data packets ends according to the transmission end instruction.

In S204, after determining that the reception of the N data packets ends, the third data transmission device 100C generates a first retransmission instruction, and sends the first retransmission instruction to the second data transmission device 100B. The first retransmission instruction includes information in the first queue.

The first retransmission instruction includes K1 pieces of first indication information indicating that data packets are transmitted incorrectly, where K1 is greater than or equal to 0, and less than or equal to N (0 K1 N), and K1 is an integer.

In S205, the second data transmission device 100B determines that the K1 pieces of first indication information in the first retransmission instruction are M pieces of first indication information.

M is a positive integer.

In S206, M retransmission data packets are sequentially sent to the third data transmission device 100C according to a sequence of the M pieces of first indication information in the first retransmission instruction.

Each retransmission data packet includes a piece of target data to be retransmitted in a data packet corresponding to a piece of first indication information.

For example, the data packet further includes the identifier, and a piece of first indication information includes an identifier in a data packet transmitted incorrectly. In this case, after the second data transmission device 100B determines that the first retransmission instruction includes M pieces of first indication information, the data transmission method further includes:

in S207, obtaining a piece of target data to be retransmitted corresponding to each identifier according to M identifiers;

in S208, generating M retransmission data packets according to M pieces of target data to be retransmitted; and in S209, determining, by the third data transmission device 100C, whether the first retransmission instruction includes piece(s) of first indication information. If so, a retransmission request instruction is sent to the second data transmission device 100B according to the first retransmission instruction. Correspondingly, the second data transmission device 100б receives the retransmission request instruction sent by the third data transmission device 100C to instruct to send the piece(s) of target data to be retransmitted.

In this case, sequentially sending, by the second data transmission device 100B, the M retransmission data packets to the third data transmission device 100C, includes:

in S210, sequentially sending, by the second data transmission device 100B, the M retransmission data packets to the third data transmission device 100C according to the retransmission request instruction.

In some embodiments, as shown in FIG. 8, the following steps are cyclically performed until the third data transmission device 100C determines that all the retransmission data packets are transmitted correctly.

In S211, the third data transmission device 100C receives the M retransmission data packets sent by the second data transmission device 100B. Each retransmission data packet includes a piece of target data to be retransmitted in a data packet corresponding to a piece of first indication information, and each retransmission data packet is used as a data packet.

In S212, the third data transmission device 100C sequentially determines whether a transmission error occurs in each data packet according to a receiving sequence of the M retransmission data packets from a first retransmission data packet to an Mth retransmission data packet.

If it is determined that a data packet is transmitted incorrectly, a piece of first indication information corresponding thereto is stored in a second queue.

In S213, after determining that the reception of the M retransmission data packets ends, the third data transmission device 100C generates a second retransmission instruction, and sends the second retransmission instruction to the second data transmission device 100B. The second retransmission instruction includes information in the second queue.

In S214, the second data transmission device 100B receives the second retransmission instruction from the third data transmission device 100C, and the second retransmission instruction includes K2 pieces of first indication information, where K2 is greater than or equal to 0, and less than or equal to M (0≤K2≤M), and K2 is an integer.

In S215, after determining that the K2 pieces of first indication information in the second retransmission instruction are P pieces of first indication information, the second data transmission device 100B sequentially sends P retransmission data packets to the third data transmission device 100C according to a sequence of the P pieces of first indication information in the second retransmission instruction. Each retransmission data packet includes a piece of target data to be retransmitted in a data packet corresponding to a piece of first indication information.

If the second retransmission instruction includes P pieces of first indication information, a value of P is assigned to M, and S211 to S215 are cyclically performed until the circle ends after it is determined that the number of the pieces of first indication information in the second retransmission instruction is zero, or after it is determined that there is no first indication information in the second retransmission instruction. P is a positive integer.

It will be noted that, beneficial effects of the data transmission method between the second data transmission device 100B and the third data transmission device 100C are same as those of the data transmission method between the first data transmission device 100A and the second data transmission device 100B, and details will not be repeated here.

To sum up, the second data transmission device 100B may not only send data but also receive data. That is, the second data transmission device 100B may be used as a receiving-end device of the first data transmission device 100A, and may also be used as a sending-end device of the third data transmission device 100C. Therefore, during data transmission, the data transmission device 100 in the embodiments of the present disclosure may be used not only as a sending-end device but also as a receiving-end device.

The data transmission device and the communication opposite-end device may both be referred to as electronic devices. It can be understood that, in order to achieve the above functions, the electronic device includes corresponding hardware and/or software modules for implementing various functions. In conjunction with algorithm steps of the examples described in the embodiments disclosed herein, the present disclosure can be implemented in a form of hardware or in a form of a combination of hardware and computer software. Whether a certain function is implemented by hardware or in a way of driving hardware by computer software depends on specific applications and design constraints of the technical solution. A person skilled in the art may implement the described functions in different ways for each specific application in combination with the embodiments, but such implementation should not be considered beyond the scope of the present disclosure.

Functional modules of the electronic device may be divided based on the above method examples in the embodiments of the present disclosure. For example, the functional modules may be divided according to functions thereof, or two or more functions may be integrated into one processing module. The above integrated module may be implemented in the form of hardware.

It will be noted that, the division of the modules in the embodiments is schematic, and is only a logical function division, and there may be other ways to divide the modules in actual implementation.

In a case where the functional modules are divided according to the functions thereof, the embodiments of the present disclosure provide the data transmission device 100 shown in FIG. 2. The data transmission device 100 includes the receiving unit 101, the sending unit 102, the storage unit 103 and the processing unit 104. The processing unit 104 is coupled to the receiving unit 101, the sending unit 102 and the storage unit 103.

The receiving unit 101 is configured to receive N data packets sent by a communication opposite-end device 200, and each data packet includes a piece of target data; N is a positive integer greater than 1.

The processing unit 104 is configured to: sequentially determine whether a transmission error occurs in each data packet according to a receiving sequence of the N data packets from a first data packet to an Nth data packet; if it is determined that the data packet is transmitted incorrectly, store a piece of first indication information indicating that the data packet is transmitted incorrectly in a first queue; and generate a first retransmission instruction after determining that the reception of the N data packets ends, the first retransmission instruction including information in the first queue.

The sending unit 102 is configured to send the first retransmission instruction to the communication opposite-end device 200.

The processing unit 104 is further configured to determine whether the first retransmission instruction includes piece(s) of first indication information. If so, the sending unit 102 sends a retransmission request instruction to the communication opposite-end device 200 to instruct the communication opposite-end device 200 to send piece(s) of target data to be retransmitted.

In addition, the receiving unit 101 receives a transmission end instruction sent by the communication opposite-end device 200, and the processing unit 104 determines that the reception of the N data packets ends according to the transmission end instruction, and stops receiving data.

In some embodiments, the sending unit 102 is further configured to sequentially send S data packets to a communication opposite-end device 200; S is a positive integer greater than 1.

It will be noted that, S and N are equal or unequal.

After the receiving unit 101 receives a request transmission instruction sent by the communication opposite-end device 200, the sending unit 102 sequentially sends the S data packets to the communication opposite-end device 200.

The receiving unit 101 is further configured to receive a first retransmission instruction from the communication opposite-end device 200. The first retransmission instruction includes K1 pieces of first indication information indicating that data packets are transmitted incorrectly; K1 is greater than or equal to 0, and less than or equal to N ($0 \leq K1 \leq N$), and K1 is an integer.

The processing unit 104 is further configured to, after determining that the K1 pieces of first indication information in the first retransmission instruction are M pieces of first indication information, sequentially send M retransmission data packets to the communication opposite-end device 200 through the sending unit 102 according to a sequence of the M pieces of first indication information in the first retransmission instruction. Each retransmission data packet includes a piece of target data to be retransmitted in a data packet corresponding to a piece of first indication information, and M is a positive integer.

After the receiving unit 101 receives a retransmission request instruction sent by the communication opposite-end device 200, the sending unit 102 sequentially sends the M retransmission data packets to the communication opposite-end device 200.

In addition, after the sending unit 102 ends sequentially sending the N data packets to the communication opposite-end device 200, the sending unit 102 sends a transmission end instruction to the communication opposite-end device 200 to instruct the communication opposite-end device 200 to stop receiving data.

It will be noted that, beneficial effects of the data transmission device 100 are same as those of the data transmission method described in some embodiments described above, and details will not be repeated here.

Figure 9:
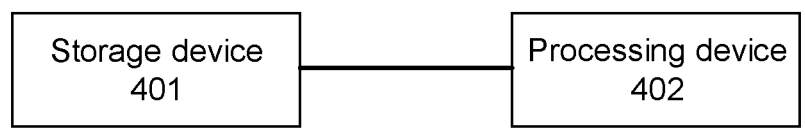
FIG. 9 is a structural diagram of a data transmission apparatus, in accordance with embodiments of the present disclosure.

Embodiments of the present disclosure provide a data transmission apparatus 400. As shown in FIG. 9, the data transmission apparatus 400 includes a storage device 401 and a processing device 402.

The storage device 401 is coupled to the processing device 402.

The storage device 401 stores one or more computer programs that may be run on the processing device 402.

The processing device 402, when executing the computer program(s), performs one or more steps of the data transmission method in some of the above embodiments.

For example, the processing device 402 may be a processor, or may be a general term of a plurality of processing elements. For example, the processing device 402 may be a central processing unit (CPU), a specific integrated circuit, or one or more integrated circuits configured to implement the embodiments of the present disclosure, such as one or more microprocessors, or one or more field programmable gate arrays (FPGAs). For example, the processing device 402 may include one or more CPUs, each of which may support a plurality of virtual CPUs (abbreviated as VCPUs).

The storage device 401 may be a memory, or a general term for a plurality of storage elements, and is used to store executable program code and the like. Moreover, the storage device 401 may include a random access memory (RAM), or a non-volatile memory such as a magnetic disk memory or a flash memory.

The storage device 401 is used to store application program code for executing the solutions of the present disclosure, and the execution is controlled by the processing device 402. The processing device 202 is used to execute the application program code stored in the storage device 401, so as to control the data transmission apparatus 400 to implement the data transmission method provided by some embodiments of the present disclosure described above.

It will be noted that, beneficial effects of the data transmission apparatus 400 are same as those of the data transmission method described in some embodiments described above, and details will not be repeated here.

Some embodiments of the present disclosure provide a computer-readable storage medium (e.g., a non-transitory computer-readable storage medium). The computer-readable storage medium has stored therein computer programs. When the computer programs runs, the computer programs cause the computer (e.g., a data transmission device) to perform one or more steps of the data transmission method as described in some embodiments described above.

The computer-readable storage medium is the non-transitory computer-readable storage medium.

For example, the computer-readable storage medium may include, but is not limited to, a magnetic storage device (e.g., a hard disk, a floppy disk or a magnetic tape), an optical disk (e.g., a compact disk (CD), or a digital versatile disk (DVD)), a smart card, or a flash memory device (e.g., an erasable programmable read-only memory (EPROM), a card, a stick or a key driver). Various computer-readable storage media described in the present disclosure may represent one or more devices and/or other machine-readable storage media, which are used to store information. The term "machine-readable storage media" may include, but is not limited to, wireless channels and various other media capable of storing, containing and/or carrying instructions and/or data.

Some embodiments of the present disclosure provide a computer program product. The computer program product includes computer programs that, when executed by a computer (e.g., a data transmission device), cause the computer to perform one or more steps of the data processing method as described in the above embodiments.

What is claimed is:

1. A data transmission method, comprising:
   receiving N data packets sent by a communication opposite-end device, each data packet including a piece of target data, and N being a positive integer greater than 1;
   sequentially determining whether a transmission error occurs in each data packet according to a receiving sequence of the N data packets from a first data packet to an Nth data packet;
   if it is determined that a data packet is transmitted incorrectly, storing a piece of first indication information indicating that the data packet is transmitted incorrectly in a first queue; and
   after determining that the reception of the N data packets ends, generating a first retransmission instruction, and sending the first retransmission instruction to the communication opposite-end device, the first retransmission instruction including information in the first queue.

2. The data transmission method according to claim 1, wherein each data packet further includes an identifier;
   if it is determined that the data packet is transmitted incorrectly, storing the piece of first indication information indicating that the data packet is transmitted incorrectly in the first queue, includes:
   if it is determined that the data packet is transmitted incorrectly, storing an identifier of the data packet including a piece of target data in the first queue.

3. The data transmission method according to claim 1, wherein each data packet further includes a first check value of the piece of target data;
   determining whether a transmission error occurs in any data packet, includes:
   obtaining a second check value through calculation according to data in a received data packet;
   determining whether the second check value is same as a first check value corresponding to the received data packet;
   if so, determining that the data packet is transmitted correctly;
   if not, determining that the data packet is transmitted incorrectly.

4. The data transmission method according to claim 1, wherein sequentially determining whether the transmission error occurs in each data packet according to the receiving sequence of the N data packets from the first data packet to the Nth data packet, includes:
   after receiving at least one data packet and before an end of receiving the N data packets, sequentially determining whether a transmission error occur in the at least one received data packet starting from the first data packet; or
   after an end of receiving the N data packets, sequentially determining whether a transmission error occurs in the first data packet to the Nth data packet.

5. The data transmission method according to claim 1, further comprising:
   before receiving the N data packets sent by the communication opposite-end device, sending a request transmission instruction to the communication opposite-end device, the request transmission instruction being configured to instruct the communication opposite-end device to send pieces of target data.

6. The data transmission method according to claim 1, wherein determining that the reception of the N data packets ends, includes:
   receiving a transmission end instruction, sent by the communication opposite-end device, instructing to stop receiving data; and
   determining that the reception of the N data packets ends according to the transmission end instruction.

7. The data transmission method according to claim 1, further comprising:
   cyclically performing following steps until it is determined that all retransmission data packets are transmitted correctly, wherein the following steps includes:
   receiving M retransmission data packets sent by the communication opposite-end device, each retransmission data packet including a piece of target data to be retransmitted in a data packet corresponding to a piece of first indication information, and each retransmission data packet being used as a data packet, M being a positive integer less than or equal to N;
   sequentially determining whether a transmission error occurs in each data packet according to a receiving sequence of the M retransmission data packets from a first retransmission data packet to an Mth retransmission data packet;
   if it is determined that a data packet is transmitted incorrectly, storing another piece of first indication information in a second queue;
   after determining that the reception of the M retransmission data packets ends, generating a second retransmission instruction, and sending the second retransmission instruction to the communication opposite-end device, the second retransmission instruction including information in the second queue; wherein
   if the second retransmission instruction includes P pieces of first indication information, a value of P is assigned to M, and a next cycle is performed; P is a positive integer.

8. The data transmission method according to claim 1, further comprising:
   determining whether the first retransmission instruction includes at least one piece of first indication information;
   if so, sending a retransmission request instruction to the communication opposite-end device according to the first retransmission instruction; the retransmission request instruction being configured to instruct the communication opposite-end device to send at least one piece of target data to be retransmitted.

9. The data transmission method according to claim 1, further comprising:
  sequentially sending S data packets to another communication opposite-end device, S being a positive integer greater than 1;
  after an end of sending the S data packets, receiving another first retransmission instruction from the another communication opposite-end device; and
  after determining that the another first retransmission instruction includes M' pieces of first indication information, sequentially sending M' retransmission data packets to the another communication opposite-end device, M' being a positive integer.

10. A data transmission apparatus, comprising:
  a storage device; and
  a processing device coupled to the storage device, wherein the storage device stores one or more computer programs therein;
  the processing device, when executing the one or more computer programs, performs one or more steps of the data transmission method according to claim 1.

11. A non-transitory computer-readable storage medium having stored therein computer programs that, when executed by a computer, cause the computer to perform one or more steps of the data transmission method according to claim 1.

12. A data transmission method, comprising:
  sequentially sending N data packets to a communication opposite-end device, each data packet including a piece of target data, and N being a positive integer greater than 1;
  receiving a first retransmission instruction from the communication opposite-end device, the first retransmission instruction including K1 pieces of first indication information indicating that data packets are transmitted incorrectly, K1 being greater than or equal to 0, and less than or equal to N ($0 \le K1 \le N$), and K1 being an integer; and
  after determining that the K1 pieces of first indication information in the first retransmission instruction are M pieces of first indication information, sequentially sending M retransmission data packets to the communication opposite-end device according to a sequence of the M pieces of first indication information in the first retransmission instruction, each retransmission data packet including a piece of target data to be retransmitted in a data packet corresponding to a piece of first indication information, and M being a positive integer less than or equal to N.

13. The data transmission method according to claim 12, wherein each data packet further includes an identifier; each piece of first indication information includes an identifier of a data packet transmitted incorrectly;
  after determining that the first retransmission instruction includes the M pieces of first indication information, the data transmission method further comprises:
  obtaining the piece of target data to be retransmitted corresponding to each identifier according to M identifiers; and
  generating the M retransmission data packets according to M pieces of target data to be retransmitted.

14. The data transmission method according to claim 12, further comprising:
  before sequentially sending the N data packets to the communication opposite-end device, receiving a request transmission instruction, sent by the communication opposite-end device, instructing to send pieces of target data; wherein
  sequentially sending the N data packets to the communication opposite-end device, includes:
  sequentially sending the N data packets to the communication opposite-end device according to the request transmission instruction.

15. The data transmission method according to claim 12, further comprising:
  before sequentially sending the M retransmission data packets to the communication opposite-end device, receiving a retransmission request instruction, sent by the communication opposite-end device, instructing to send M pieces of target data to be retransmitted; wherein
  sequentially sending the M retransmission data packets to the communication opposite-end device, includes:
  sequentially sending the M retransmission data packets to the communication opposite-end device according to the retransmission request instruction.

16. The data transmission method according to claim 12, further comprising:
  receiving a second retransmission instruction from the communication opposite-end device, the second retransmission instruction including K2 pieces of first indication information, K2 being greater than or equal to 0, and less than or equal to M ($0 \le K2 \le M$), and K2 being an integer; and
  after determining that the K2 pieces of first indication information in the second retransmission instruction are P pieces of first indication information, sequentially sending P retransmission data packets to the communication opposite-end device according to a sequence of the P pieces of first indication information in the second retransmission instruction, each retransmission data packet including a piece of target data to be retransmitted in a data packet corresponding to a piece of first indication information, and P being a positive integer.

17. A data transmission apparatus, comprising:
  a storage device; and
  a processing device coupled to the storage device, wherein
  the storage device stores one or more computer programs therein;
  the processing device, when executing the one or more computer programs, performs one or more steps of the data transmission method according to claim 12.

18. A non-transitory computer-readable storage medium having stored therein computer programs that, when executed by a computer, cause the computer to perform one or more steps of the data transmission method according to claim 12.

19. A data transmission device, comprising:
  a receiving unit configured to receive N data packets sent by a communication opposite-end device, each data packet including a piece of target data, and N being a positive integer greater than 1;
  a sending unit;
  a storage unit; and
  a processing unit coupled to the receiving unit, the sending unit and the storage unit, wherein
  the processing unit is configured to: sequentially determine whether a transmission error occurs in each data packet according to a receiving sequence of the N data packets from a first data packet to an Nth data packet;

if it is determined that a data packet is transmitted incorrectly, store a piece of first indication information indicating that the data packet is transmitted incorrectly in a first queue; and generate a first retransmission instruction after determining that the reception of the N data packets ends, the first retransmission instruction including information in the first queue;

the sending unit is configured to send the first retransmission instruction to the communication opposite-end device.

20. The data transmission device according to claim 19, wherein the sending unit is further configured to sequentially send S data packets to another communication opposite-end device; S is a positive integer greater than 1;

the receiving unit is further configured to receive another first retransmission instruction from the another communication opposite-end device; the first retransmission instruction includes K1 pieces of first indication information indicating that data packets are transmitted incorrectly; K1 is greater than or equal to 0, and less than or equal to S ($0 \leq K1 \leq S$), and K1 is an integer;

the processing unit is further configured to, after determining that the K1 pieces of first indication information in the another first retransmission instruction are M pieces of first indication information, control the sending unit to sequentially send M retransmission data packets to the another communication opposite-end device according to a sequence of the M pieces of first indication information in the another first retransmission instruction; each retransmission data packet includes a piece of target data to be retransmitted in a data packet corresponding to a piece of first indication information, and M is a positive integer.

* * * * *